Figure 1:
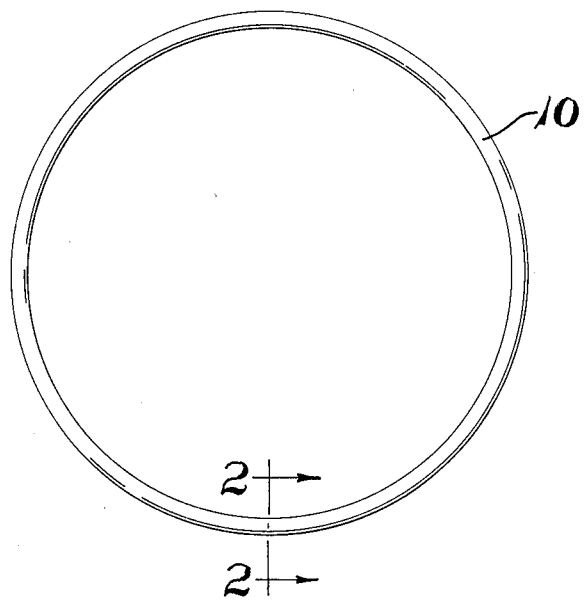

March 1, 1966 C. B. BUDD ETAL 3,237,674
LIGHTWEIGHT BEAD FOR PNEUMATIC TIRES
Filed Sept. 1, 1964

INVENTORS
CHESTER B. BUDD
BY FLOYD D. STEWART
Albert C. Doxey
ATTY.

United States Patent Office 3,237,674
Patented Mar. 1, 1966

3,237,674
LIGHTWEIGHT BEAD FOR PNEUMATIC TIRES
Chester B. Budd, West Richfield, and Floyd D. Stewart, Akron, Ohio, assignors to The B. F. Goodrich Company, New York, N.Y., a corporation of New York
Filed Sept. 1, 1964, Ser. No. 393,747
2 Claims. (Cl. 152—362)

This invention is concerned with the development of new bead assemblies for pneumatic tires and is more specifically concerned with the replacement of the bead wire element in the bead assembly by a new, lightweight, flexible, very strong element comprising a hooplike structure of glass fibers embedded in epoxy resin.

The bead assembly in the pneumatic tire is the element of the tire which holds the tire on the rim. This assembly in the finished tire, must be almost rigid, yet able to flex enough without breaking in order to allow the tire to be slipped over the rim in mounting and dismounting steps. It must be virtually inextensible to maintain the position of the tire on the rim against centrifugal force as the tire rotates at high speeds.

The reinforcing element in the bead assembly of today's pneumatic tires is based on steel bead wire. Usually, several fine wires are simultaneously coated with plastic rubber; then intertwined and wound in a helical configuration to form an annulus. These bead wires may be plated or otherwise treated to prevent corrosion and to promote their adhesion to the rubber. The "green" bead is often wrapped with fabric tape to insure its retaining its configuration as the tire is assembled. "Green" bead assemblies are substantially square or rectangular in configuration, but during vulcanizing of the tire, they are squeezed into a substantially triangular configuration as the rubber flows under heat and pressure in the tire mold. It would be desirable to avoid this flow of rubber in the molding and curing operation because it is possible for wires to come into metal to metal contact, setting up potential weak spots in the tire where moisture may eventually reach to start corrosion and deterioration of the bead. Glass fiber-epoxy resin beads are rust proof and resist change in configuration under pressure.

Another disadvantage of today's wire reinforced bead assemblies, particularly for airplane use, is that they are heavy and weight which is frozen into the plane construction penalizes the pay load which can be carried. The novel tire beads of this invention can replace conventional steel wire beads and, on an equal strength basis, save ⅔ of the cross-sectional area and ¾ of the weight. In elongation the new beads are superior, showing a value of 3% against 2.5% for steel wire beads.

One of the best materials known with respect to its strength to weight ratio is continuous filament glass fiber. For strands of equal cross-sectional area, glass fiber displays a tensile strength 1 to 1½ times as great as steel, the material used in most present day bead wire. The great tensile strength of glass fiber is generally offset by two great weaknesses, its rapid failure by abrasion at points of glass to glass contact and its low flex strength. Attempts have been made to coat glass fibers with elastomeric materials, rubbery polymers, for instance, to avoid the glass to glass contact and to provide greater flex strength, but the degree of success along these lines has not produced a glass fiber configuration that can be employed as a reinforcement element in a pneumatic tire. It is also known to use glass fiber as a reinforcing material in plastic laminate constructions. These are used to form rigid shapes such as building panels and rocket cases. No one has successfully employed glass fiber in the reinforcing element of the bead assembly of a pneumatic tire.

It has been discovered that continuous filament glass fiber can be combined with an epoxy resin matrix and molded into a hooplike shape that will serve as a completely effective reinforcing element in the bead assembly of a pneumatic tire. When compared on an equal strength basis to the bead wire it replaces, this glass fiber-epoxy resin combination occupies one-third the volume and weighs only one-fourth as much. The glass fiber-epoxy resin bead is also flexible enough to withstand the strains of tire mounting and dismounting, is easily handled in the tire building operation, eliminates the need for troublesome metal treatments such as brass-plating and is readily adhered to rubber and fabric elements with which it is contacted in the tire building operation. In the glass-resin beads of this invention, the epoxy resin forms a matrix around the glass fiber and prevents the weakening glass to glass contact. Further, the resin has sufficient elongation strength that it is able to elongate as much as the use of the tire demands, thereby allowing the great tensile strength of the glass fibers to be effectively used in resisting the tensile forces exerted on the tire as in airplane landings or in high speed rotation. A totally unexpected benefit of this discovery is that a glass fiber, coated and encased in epoxy resin exhibits yarn tensile strengths up to twice that of a control uncoated glass fiber.

Figure 2:
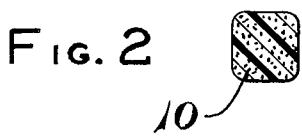
Figure 3:
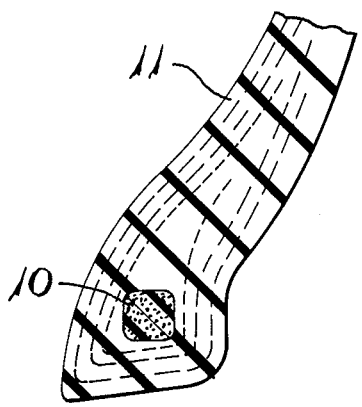

The improved tire bead of this invention is shown in the accompanying drawing wherein FIGURE 1 is a side view of the resin-impregnated glass fiber bead 10 constructed in accordance with this invention; FIGURE 2 is a cross-section taken substantially on line 2—2 of FIGURE 1, and FIGURE 3 is a reduced cross-section of a cured pneumatic tire casing 11 having the bead structure of the invention incorporated therein.

The term "epoxy resin" as used herein describes the polymeric reaction products of polyfunctional halohydrins such as epihalohydrins with polyfunctional hydrogen-donating reactants, or their salts, such as polyfunctional phenols, alcohols, amines, acids and their salts. The major reaction is presumably a splitting out of hydrogen or metal halide with simultaneous opening and reaction of the epoxy ring. The resin molecule would then contain functional hydroxy side groups, 1.2 epoxy end groups, and ethereal or ester linkages. A small proportion of hydroxy end groups are also likely to be present. Other terms often used synonomously with "epoxy resin" are "polymeric glycidyl ethers" and "epoxy-hydroxy polyether resins." The term "poly resin" as used herein is also intended to include glycidyl polyesters as well as glycidyl polyethers. The important common properties are the resinous character and the functional 1.2 epoxy and hydroxy groups. Epoxy resins are also preparable from epoxy containing compounds having a non-halide, hydrogen bonding reaction group and oxidation of polyolefins with peracetic acid. These resins have the ability to transform from liquids to tough, hard thermosetting solids.

A typical method of preparing an epoxy resin is described in United States Patent No. 2,500,449 in which epichlorohydrin is reacted with bisphenol at 100° C. in the presence of sufficient alkali to bind the hydrochloric acid formed. The resins formed vary according to the molal proportions and reaction conditions, and have melting points ranging from 43° to 112° C. In this particular case the end groups are presumed to be epoxy groups while there are many intermediate functional hydroxy groups. Further hardening of a typical epoxy resin such as this is provided by heating with a conventional hardening agent, usually bi-functional, which acts to cross-link the previously formed resin, e.g., oxalic acid, citric acid, anhydrides of polycarboxylic acids, inorganic bases, organic bases, and acidic or electron pair acceptors, such as tertiary amines and boron trifluoride. Other epoxy resins and methods are described in United States Patents, 2,444,333; 2,528,932; 2,500,600; 2,467,171 and others.

Epoxy resins are available commercially in a wide range of epoxy content, molecular weight, softening point and composition. Common sources of such commercial resins are Shell Chemicals Co. (Epon resins) and Ciba, Ltd. (Araldite resins). The resins range from liquids (molecular weight below 500) to high molecular weight solids. Liquid expoxies can be used as such to coat glass fibers in the practice of this invention and higher molecular weight resins can be melted and coated on the glass fiber or dissolved in solvent such as methylethyl ketone or acetone and deposited on the glass fibers from solution by standard techniques.

The filamentary glass used for the reinforcement of the epoxy resins in this invention is the continuous filament, high strength glass fiber available on the market and known as "E" glass. Glass fiber yarns are manufactured by several companies and are described by a standard terminology of alphabetical and numerical designations. The first letter defines the glass composition—"E" for electrical and "C" for chemical. The formulae vary depending upon the intended use of the glass. The second letter indicates the type of fiber—"C" for continuous filament and "S" for staple fibers. The third letter defines the average fiber or filament diameter from which the yarn is made. The values for the third letter are:

"D" ---------------------------------- 0.00023"
"E" ---------------------------------- 0.00028"
"F" ---------------------------------- 0.00033"
"G" ---------------------------------- 0.00038"

The numbers following the letters indicate the hundred yards per pound and yarn construction. The first number (count), i.e. 150, etc. is $\frac{1}{100}$ of the approximate yardage of basic strand in one pound. The second series of numbers following the count number (—½, —⅜, etc.) designates the number of plies in continuous filament yarns. The first digit in this series shows the number of strands twisted and is separated by a diagonal line from the second digit that indicates the number of units plied. Any electrical grade, continuous filament, glass fiber presently known is capable of combining with an epoxy resin and being molded in the configuration of a tire bead in this invention. Electrical grade, continuous filament glass fibers range from filament diameters of 0.00023" to 0.00038", and from 900 yards per pound of basic strand to 150 yards per pound of basic strand. Glass that is spinnable into continuous filament and is compatible with epoxy resins is useful in the practice of this invention.

A method employed to test the strength of filament glass-epoxy resin compositions is to prepare a ring-shaped, parallel wound test specimen 0.200 inch wide x 0.100 inch thick with a 6.0 inch inside diameter by winding resin-impregnated glass yarn on a ring mold and curing in place. A tension compensator, a heated resin impregnation bath, a wind-up and traversing mechanism and a curing oven are required. The test piece is similar to ones developed by the Naval Ordnance Laboratory as described in Erickson, Silver, Perry "Proposed NOL Ring Test Method for Parallel Glass Roving Reinforced Plastics: Evaluation of Chemical Finishes," NAVORD Report 5680, July 1, 1959 and is referred to as an "NOL" tensile ring. The rings are tested in hoop tension at room temperature using a split disc test fixture and an Instron crosshead speed of 0.2 inch per minute. The two sections of the split disc test fixture separate upon application of load, and the test specimen tends to straighten at the region of separation. Hoop tensile strength in p.s.i. is obtained by dividing the load by twice the cross-sectional area. Yarn strength in pounds is obtained by dividing the breaking load in pounds by twice the number of yarns in the ring. These NOL type tensile rings accurately test the glass reinforcement and serve to evaluate the resin matrix in the glass-resin composite. The ability of the matrix to protect the reinforcement and distribute the applied forces is reflected in the ultimate elongation and in the breaking load.

Generally, tensions of 12–25 grams, measured before the immersion of the glass yarn in the resin bath, were employed. Two series of rings wound at 15 grams tension and 150 grams tension gave similar average yarn strength, showing that yarn tension is not a critical factor.

It has also been found that the use of solvent in ring winding resin formulations does not influence the laminate or ring strength. The amount of epoxy resin deposited on the glass can be varied by changing the viscosity of the resin and the tension applied to the glass fibers as they are wound on the ring forms. Low viscosity resin and low glass tension gives high proportions of resin to glass in the final structure. Increasing the viscosity of the resin and the tension of the glass fibers leads to lower amounts of resin deposition and higher proportions of glass in the final structure. One skilled in the art can readily adjust the factors to produce tensile rings or tire beads containing the desired proportions of resin and glass fiber. The rings are cured in a forced draft oven for 4 hours at 120° C. From 10% to 40% by weight of resin has been found to produce the most satisfactory tire bead structures. When the proportion of resin is above 45–50% by weight, the beads fail under stresses that can be borne by ordinary steel wire beads, below 10% resin by weight leads to beads lacking in strength.

The following examples illustrate the remarkable utility and advantages of these new tire beads:

*Example I*

Four standard bead wire rings were taken from a tire production line. The beads were composed of five bands of wire, with each band containing five wires. Measurements of thickness and width determined the average thickness as 0.293 inch and the average width as 0.312 inch. Inside diameter was 13.27 inches. From these measurements, the bead volume was calculated to be 3.902 cubic inches. The bead weight was 210 grams and density was calculated as 0.1102 lb./in.$^3$.

Four resin-glass rings prepared in the same manner as the six inch NOL test rings, except using larger ring molds, having 13.65 inches inside diameter and containing 20% resin by weight, gave a computed density of 0.0778 lb./in.$^3$.

These beads were tested in tensile and elongation on an Olson Test Machine, following the procedure used in testing NOL test rings. At a load of 21,000 pounds, the resin-glass beads averaged over 212,000 p.s.i. tensile strength. At a load of 12,000 pounds, three of the four steel beads failed, averaging 64,400 p.s.i. tensile strength. The resin-glass beads showed an ultimate elongation of 3% compared to the 2.5% of the steel beads. When similar beads were heat aged 50 hours at 100° C. and tested, it was found that the steel beads were unaffected, but the resin-glass beads became even stronger.

*Example II*

Two tubeless 7.50–14, 6 ply airplane tires were built according to production standards employing resin-glass beads containing 20% resin in place of conventional steel beads. One tire was tested in a burst test and failed through the carcass at 445 lb./in.$^2$, comparable to similar tires with conventional beads. The second tire was subjected to landing tests. It survived 100 landings at 82–38 m.p.h., 100 landings at 120–102 m.p.h. and 25 landings at 120–70 m.p.h. as required by military specification MIL–T–5041.

The epoxy resin-glass fiber beads of this invention are readily adaptable to present day methods of tire production and are easily substituted for the conventional steel bead wire in the bead portion of the tire. Adhesion of the new beads to rubber is readily obtained with standard tire system adhesives such as resorcinol-formaldehyde latex, known as RFL, and with phenolic resin, chlorinated rubber, isocyanate adhesive systems.

We claim:
1. A tire bead reinforcement comprising a hoop shaped structure of continuously wound, epoxy resin dipped, continuous filament glass fiber, said structure containing 8% to 40% by weight of epoxy resin and 92% to 60% by weight of glass fiber.
2. A rubber tire having as the reinforcing member of the bead assembly in place of conventional steel bead wire, a hoop shaped structure of continuously wound, epoxy resin dipped, continuous filament glass fiber containing from 8% to 40% by weight epoxy resin and from 92% to 60% by weight glass fiber.

References Cited by the Examiner
UNITED STATES PATENTS

| | | | |
|---|---|---|---|
| 1,969,438 | 8/1934 | Warden | 152—362 |
| 2,945,638 | 7/1960 | Crawford et al. | |
| 3,134,704 | 5/1964 | Modigliani. | |

FOREIGN PATENTS 1,113,152  8/1961  Germany.

EUGENE G. BOTZ, *Primary Examiner.*

ARTHUR L. LA POINT, *Examiner.*

C. W. HAEFELE, *Assistant Examiner.*